July 24, 1956  R. A. WIRTH  2,755,717
SOIL PULVERIZER AND LEVELER

Filed Nov. 5, 1952  2 Sheets-Sheet 1

Robert A. Wirth
INVENTOR.

July 24, 1956　　　R. A. WIRTH　　　2,755,717
SOIL PULVERIZER AND LEVELER
Filed Nov. 5, 1952　　　　　　2 Sheets-Sheet 2
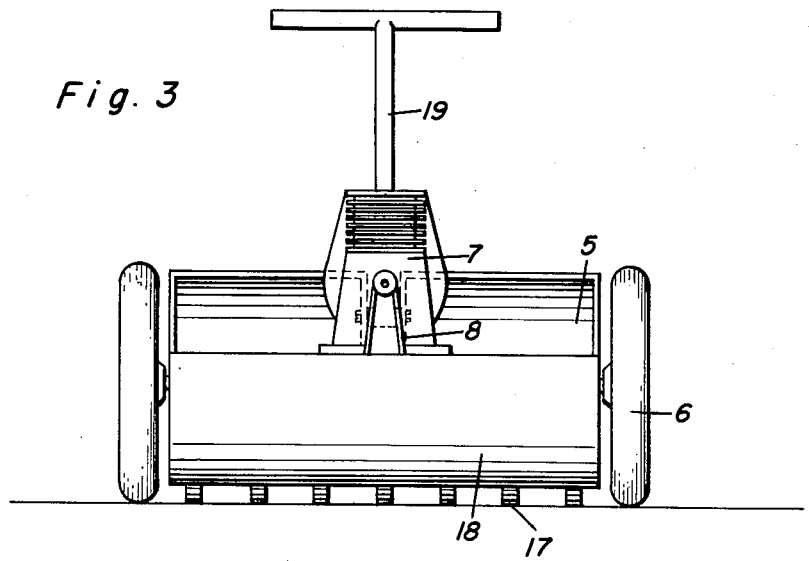
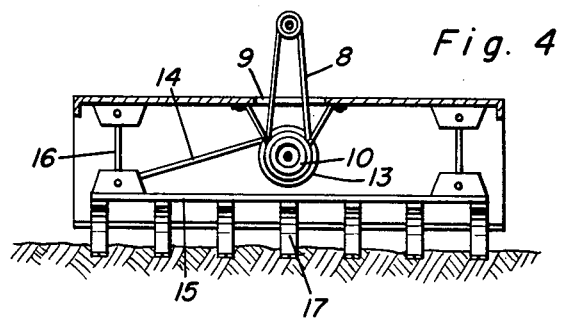
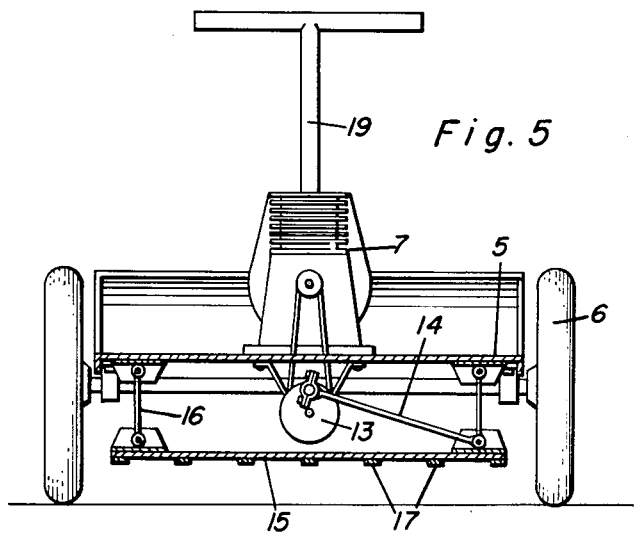
Robert A. Wirth
INVENTOR.

United States Patent Office 2,755,717
Patented July 24, 1956

2,755,717

SOIL PULVERIZER AND LEVELER

Robert A. Wirth, Nebraska City, Nebr., assignor of fifty per cent to Leonard E. Harris, Nebraska City, Nebr.

Application November 5, 1952, Serial No. 318,820

2 Claims. (Cl. 97—9)

The present invention relates to new and useful improvements in agricultural machines and more particularly to a soil pulverizer, weeder and soil leveler.

An important object of the invention is to provide pulverizing teeth carried by a shaker bar adapted to work the teeth in a reciprocating movement below the surface of the soil to loosen and pulverize the soil and cut the roots of weeds to prevent re-growth thereof.

Another object is to provide power means for actuating the teeth carried by a wheeled frame to support the teeth at a desired working depth.

A further object is to provide a device of this character of simple and practical construction which is efficient and dependable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, in which:

Figure 3 is a front elevational view; and

Figure 1:
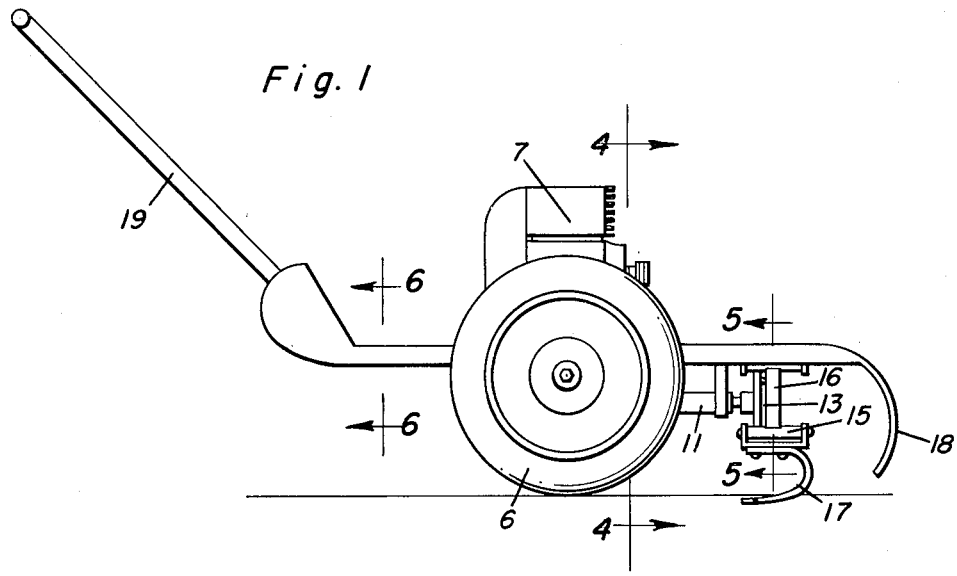
Figure 1 is a side elevational view.
Figure 2:
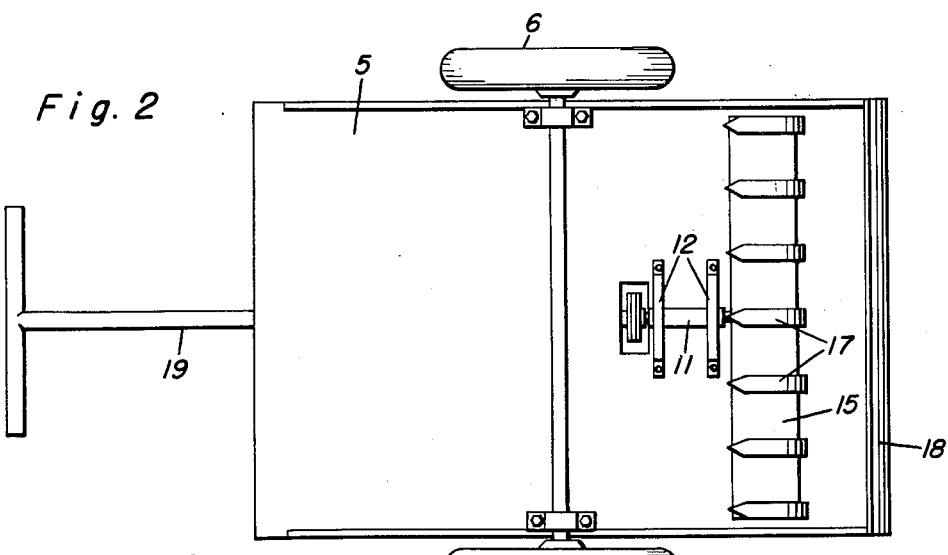
Figure 2 is a bottom plan view.
Figure 6:
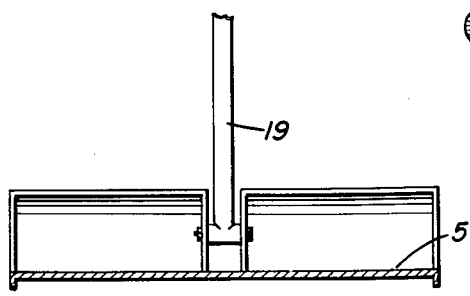

Figures 4, 5 and 6 are transverse sectional views taken respectively on the lines 4—4, 5—5, and 6—6 of Figure 1.

Referring now to the drawings in detail, wherein for the purpose of illustration I have disclosed a preferred embodiment of my invention, the numeral 5 designates a platform or frame supported on wheels 6.

A power plant 7 is mounted on the platform which drives a belt 8 extending downwardly through an opening 9 in the platform to a pulley 10 fixed to a shaft 11 journaled in bearing brackets 12 at the underside of the platform.

A pitman wheel or eccentric 13 is secured to shaft 11 to which one end of a pitman 14 is secured, while the other end of the pitman is connected to a shaker bar 15 which is swingably suspended by hanger rods 16 from the underside of the platform for swinging back and forth transversely of the platform.

A plurality of forwardly extending downwardly curved teeth 17 are secured at spaced apart intervals to shaker bar 15 with their forwardly projecting ends adapted to penetrate the soil.

The rear end of platform 5 is formed with a forwardly curved leveler blade 18 in a position rearwardly of the teeth 17 and with the lower edge of blade 18 above the horizontal plane of the lower ends of the teeth.

A handle 19 is attached to the front of the platform or frame 5 and by means of which the machine is pulled over the ground either by hand or by a tractor.

In the operation of the device, the shaker bar 15 is rapidly reciprocated as the machine moves over the ground and the teeth 17 which project downwardly from the shaker bar penetrate the soil and pulverize the soil as well as cut the roots of weeds. Blade 18 follows behind the teeth 17 to level the soil.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An agricultural machine comprising a wheeled platform embodying means for pulling the machine over the ground, a power plant mounted on the top of the platform, a plurality of U-shaped earth working elements having forwardly projecting lower earth working end portions, means at the under rear portion of the platform and supporting said elements in earth working position for back and forth lateral movement of said elements substantially horizontally in the earth, drive means connecting the power plant to said supporting means, and a downwardly and then forwardly curved leveling blade integrally formed at the rear edge portion of the platform behind the earth working elements.

2. An agricultural machine comprising a wheel supported platform embodying means for pulling the machine over the ground, a power plant mounted on top of the platform, a pair of hanger rods pivotally attached to the underside of the platform and extending downwardly therefrom, a shaker bar supported at the lower ends of the hanger rods for swinging movement in a horizontal plane transversely under the platform, actuating means connecting the shaker bar to the power plant, a plurality of U-shaped earth working elements attached at one of their end portions in spaced apart parallel relation to each other to the underside of the shaker bar and with the other end portions of said earth working elements supported in a forwardly extending position; and a downwardly and then forwardly curved extension at the rear edge portion of the platform behind the earth working elements to form a leveling blade.

References Cited in the file of this patent

UNITED STATES PATENTS

| | | |
|---|---|---|
| 432,286 | Shepherd | July 15, 1890 |
| 1,171,010 | Von Meyenburg | Feb. 8, 1916 |
| 1,697,572 | Perham | Jan. 1, 1929 |
| 1,878,442 | Hamshaw | Sept. 20, 1932 |
| 1,886,335 | Glasier | Nov. 1, 1932 |
| 2,028,957 | Swan | Jan. 28, 1936 |
| 2,063,769 | Suelflow et al. | Dec. 8, 1936 |
| 2,227,650 | Imus | Jan. 7, 1941 |
| 2,241,675 | Rinehart | May 13, 1941 |
| 2,491,892 | Claus | Dec. 20, 1949 |
| 2,517,733 | Takats | Aug. 8, 1950 |
| 2,551,120 | Harrison | May 1, 1951 |
| 2,613,582 | Harshberger | Oct. 14, 1952 |

FOREIGN PATENTS

| | | |
|---|---|---|
| 837,779 | France | Nov. 18, 1938 |
| 608,512 | Great Britain | Sept. 16, 1948 |
| 646,318 | Great Britain | Nov. 22, 1950 |
| 810,673 | Germany | Aug. 13, 1951 |